US012113733B2

(12) United States Patent
Chen et al.

(10) Patent No.: US 12,113,733 B2
(45) Date of Patent: Oct. 8, 2024

(54) PROCESSING RELAXATION FOR APERIODIC CSI-RS

(71) Applicant: QUALCOMM Incorporated, San Diego, CA (US)

(72) Inventors: Wanshi Chen, San Diego, CA (US); Chao Wei, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 16/301,907

(22) PCT Filed: May 10, 2017

(86) PCT No.: PCT/CN2017/083768
§ 371 (c)(1),
(2) Date: Nov. 15, 2018

(87) PCT Pub. No.: WO2018/006648
PCT Pub. Date: Jan. 11, 2018

(65) Prior Publication Data
US 2019/0288812 A1      Sep. 19, 2019

(30) Foreign Application Priority Data

Jul. 7, 2016     (WO) ................ PCT/CN2016/089063

(51) Int. Cl.
*H04B 7/06*          (2006.01)
*H04L 1/00*          (2006.01)
(Continued)

(52) U.S. Cl.
CPC ......... *H04L 5/0048* (2013.01); *H04B 7/0626* (2013.01); *H04L 1/0003* (2013.01);
(Continued)

(58) Field of Classification Search
USPC .......................................... 370/329
See application file for complete search history.

(56) References Cited

U.S. PATENT DOCUMENTS

| 9,306,720 | B2* | 4/2016 | Takeda .................. | H04L 1/003 |
| 9,553,648 | B2* | 1/2017 | Papasakellariou .... | H04L 1/0026 |

(Continued)

FOREIGN PATENT DOCUMENTS

| CN | 103391631 A | 11/2013 |
| CN | 103503514 A | 1/2014 |

(Continued)

OTHER PUBLICATIONS

CATT, 3GPP TSG RAN WG1 Meeting #85 R1-164217 (Year: 2016).*

(Continued)

*Primary Examiner* — Jeffrey M Rutkowski
*Assistant Examiner* — Luna Weissberger
(74) *Attorney, Agent, or Firm* — QUALCOMM Incorporated

(57) ABSTRACT

Processing relaxation for aperiodic channel state information (CSI) reference signal (CSI-RS) is discussed for networks that include full dimension multiple input, multiple output (FD-MIMO) operations. A user equipment (UE) operating in such a system monitors for the presence of aperiodic CSI-RS. When such aperiodic CSI-RS are detected, the UE may provide process relaxation in CSI reporting by transmitting aperiodic CSI reporting according to an uplink shared channel limitation, or by relaxing the processing of the aperiodic CSI reporting transmitted by the UE, or a combination of both.

27 Claims, 12 Drawing Sheets

(51) Int. Cl.
*H04L 5/00* (2006.01)
*H04W 48/02* (2009.01)
*H04W 72/12* (2023.01)
*H04W 72/23* (2023.01)
*H04W 88/02* (2009.01)

(52) U.S. Cl.
CPC ............ *H04L 1/0027* (2013.01); *H04L 5/005* (2013.01); *H04L 5/0057* (2013.01); *H04W 48/02* (2013.01); *H04W 72/12* (2013.01); *H04W 72/23* (2023.01); *H04W 88/02* (2013.01)

(56) References Cited

U.S. PATENT DOCUMENTS

| | | | |
|---|---|---|---|
| 9,949,275 | B2 | 4/2018 | Chen et al. |
| 2011/0235743 | A1* | 9/2011 | Lee ........................ H04L 5/0053 375/295 |
| 2011/0243079 | A1* | 10/2011 | Chen ...................... H04B 7/0639 370/329 |
| 2012/0147794 | A1* | 6/2012 | Chung .................. H04L 5/0057 370/280 |
| 2012/0224652 | A1* | 9/2012 | Chen ...................... H04B 7/0626 375/296 |
| 2013/0195045 | A1* | 8/2013 | Papasakellariou .. H04W 72/042 370/329 |
| 2014/0010126 | A1 | 1/2014 | Sayana et al. |
| 2014/0334391 | A1* | 11/2014 | Khoshnevis .......... H04W 24/10 370/329 |
| 2014/0341051 | A1* | 11/2014 | Gaal ..................... H04L 5/1469 370/252 |
| 2014/0369242 | A1* | 12/2014 | Ng ........................ H04L 5/0098 370/280 |
| 2015/0162966 | A1 | 6/2015 | Kim et al. |
| 2016/0212649 | A1 | 7/2016 | Chen et al. |
| 2017/0289995 | A1* | 10/2017 | Lin .................... H04W 72/0446 |
| 2017/0317731 | A1* | 11/2017 | Chen ........................ H04B 7/04 |
| 2018/0234136 | A1* | 8/2018 | Marinier .............. H04B 7/0636 |
| 2019/0123864 | A1* | 4/2019 | Zhang ................... H04L 5/0051 |

FOREIGN PATENT DOCUMENTS

| | | |
|---|---|---|
| CN | 104052532 A | 9/2014 |
| CN | 104081827 A | 10/2014 |
| CN | 104428998 A | 3/2015 |
| WO | WO-2014007512 A1 | 1/2014 |
| WO | WO-2015050743 A1 | 4/2015 |
| WO | WO-2016115491 A1 | 7/2016 |

OTHER PUBLICATIONS

"CATT—On a Periodic CSI-RS Transmission", Discussion and Decision, 3GPP TSG RAN WG1 Meeting #85, Nanjing, China, May 23-27, 2016, R1-164217, May 27, 2016, (May 27, 2016), sections 1 and 2, 3 pages.

International Search Report and Written Opinion—PCT/CN2016/089063—ISA/EPO—Apr. 1, 2017.

International Search Report and Written Opinion—PCT/CN2017/083768—ISA/EPO—Aug. 8, 2017.

Supplementary European Search Report—EP17823460—Search Authority—Munich—Feb. 21, 2020.

ZTE: "Constraints on CSI Processing for CoMP", 3GPP TSG RAN WG1 Meeting #70, 3GPP Draft; R1-123377 Constraints_Comp_CSI, 3rd Generation Partnership Project (3GPP), Mobile Competence Centre; 650, Route Des Lucioles; F-06921 Sophia-Antipolis Cedex; France, vol. RAN WG1, No. Qingdao, China; Aug. 13, 2012-Aug. 17, 2012, Aug. 5, 2012 (Aug. 5, 2012), 3 Pages, XP050661265, Retrieved from the Internet: URL: http://www.3gpp.org/ftp/tsg_ran/WG1_RL1/TSGR1_70/Docs/ [retrieved on Aug. 5, 2012] section 2.

* cited by examiner

PROCESSING RELAXATION FOR APERIODIC CSI-RS

CROSS-REFERENCE TO RELATED APPLICATIONS

This application claims the benefit of PCT/CN2016/089063, entitled, "PROCESSING RELAXATION FOR APERIODIC CSI-RS," filed on Jul. 7, 2016, which is expressly incorporated by reference herein in its entirety.

BACKGROUND

Field

Aspects of the present disclosure relate generally to wireless communication systems, and more particularly, to processing relaxation for aperiodic channel state information (CSI) reference signal (CSI-RS).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks. Time Division Multiple Access (TDMA) networks. Frequency Division Multiple Access (FDMA) networks. Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes monitoring, by a UE, for presence of aperiodic channel state information (CSI) reference signals (CSI-RS), in response to detection of the aperiodic CSI-RS, one or both of transmitting aperiodic CSI reporting according to an uplink shared channel limitation, and relaxing processing of the aperiodic CSI reporting transmitted by the UE.

In an additional aspect of the disclosure, an apparatus configured for wireless communication includes means for monitoring, by a UE, for presence of aperiodic CSI-RS, and, in response to detection of the aperiodic CSI-RS, one or both of means for transmitting aperiodic CSI reporting according to an uplink shared channel limitation, and means for relaxing processing of the aperiodic CSI reporting transmitted by the UE.

In an additional aspect of the disclosure, a non-transitory computer-readable medium having program code recorded thereon which, when executed by a computer, causes the computer to perform or control the performance of various actions or functionality. The program code further includes code to monitor, by a UE, for presence of aperiodic CSI-RS, and, in response to detection of the aperiodic CSI-RS, execution of one or both of code to transmit aperiodic CSI reporting according to an uplink shared channel limitation, and code to relax processing of the aperiodic CSI reporting transmitted by the UE.

In an additional aspect of the disclosure, an apparatus configured for wireless communication is disclosed. The apparatus includes at least one processor, and a memory coupled to the processor. The processor is configured to monitor, by a UE, for presence of aperiodic CSI-RS, and, in response to detection of the aperiodic CSI-RS, execution of a configuration of the at least one processor to one or both of transmit aperiodic CSI reporting according to an uplink shared channel limitation, and relax processing of the aperiodic CSI reporting transmitted by the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
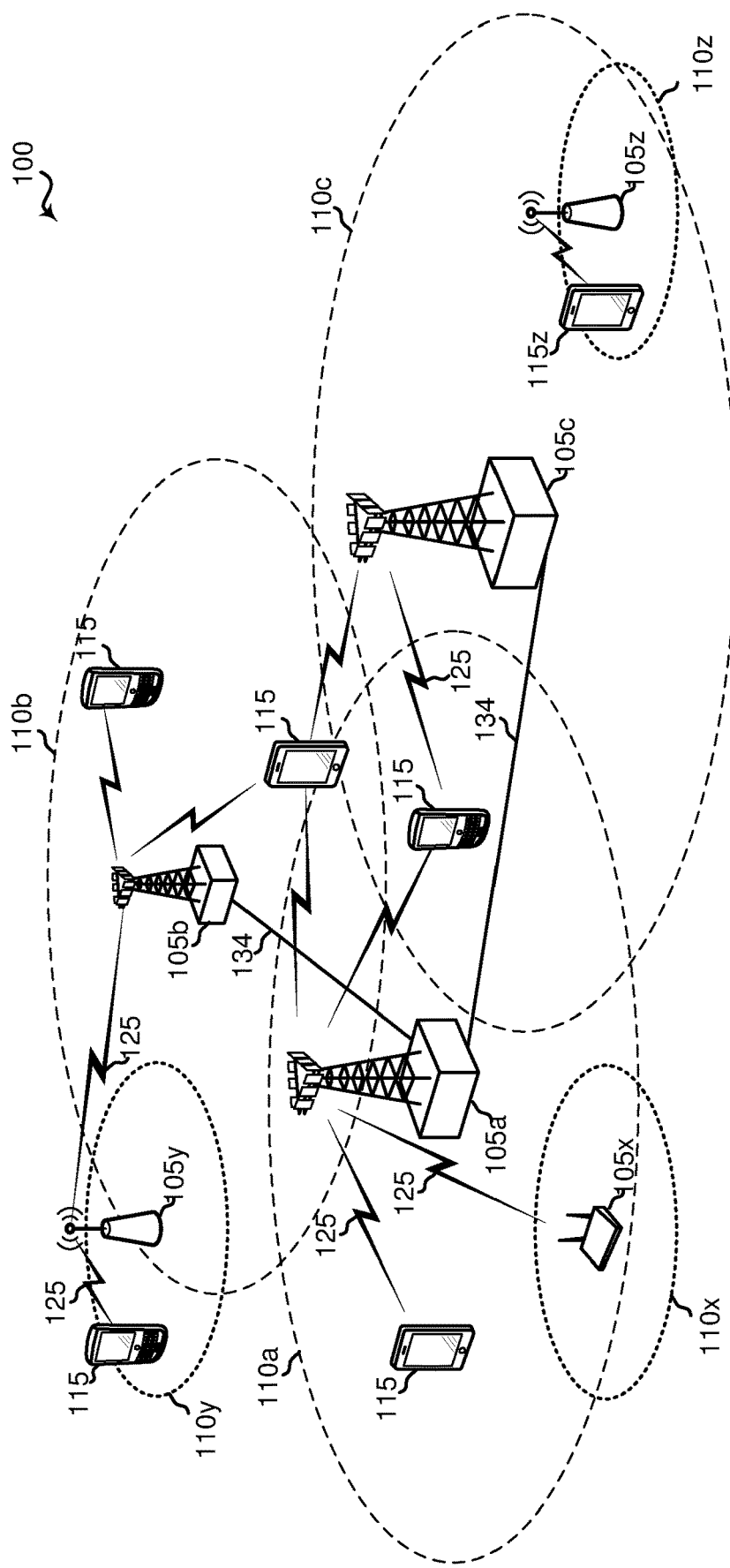
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA). cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA). IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA. GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11 a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz. or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
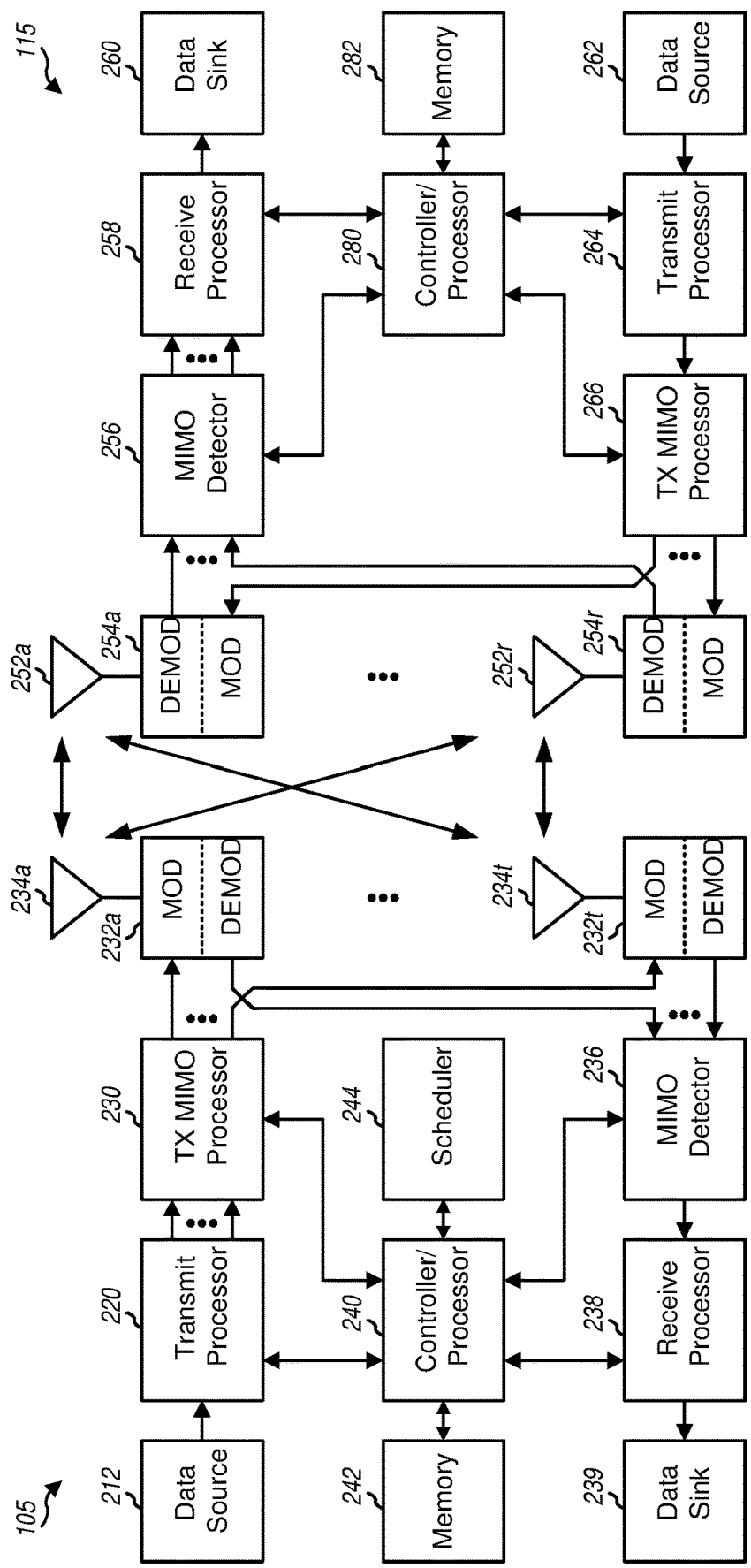
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to a controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 7, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
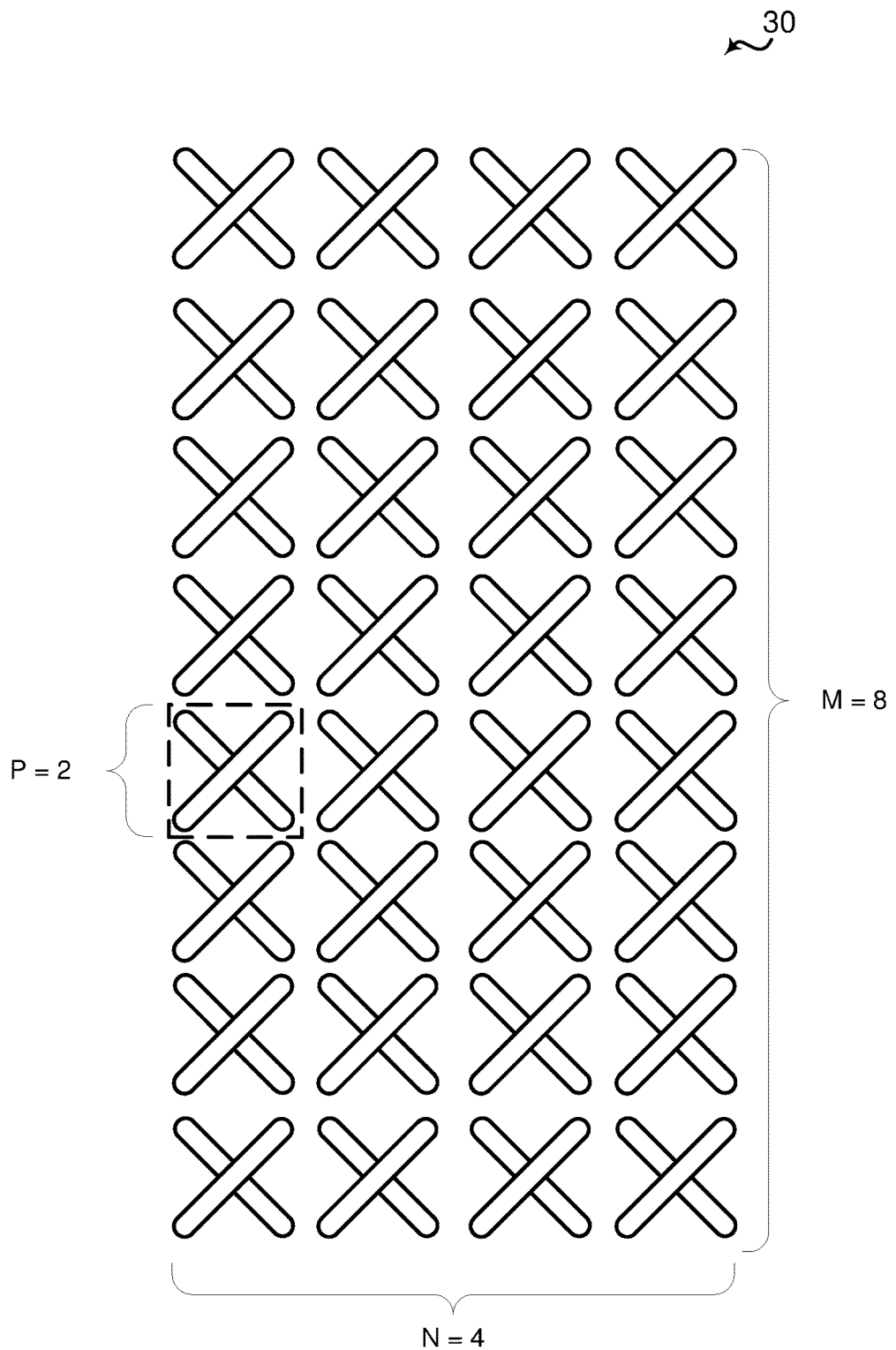
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 4A:
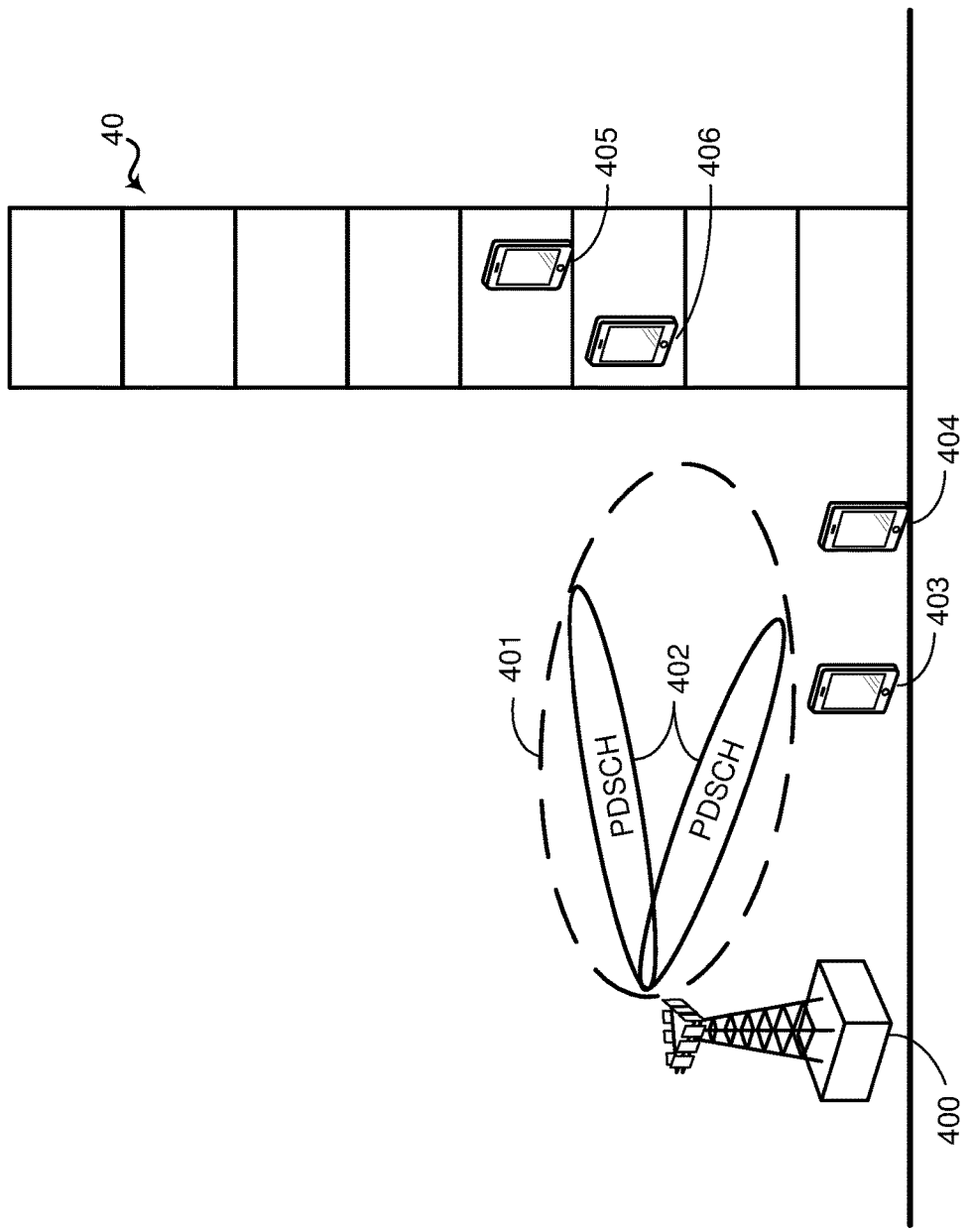
FIG. 4A is a block diagram illustrating an example base station transmitting non-precoded CSI-RS.

For CSI reporting in systems having FD-MIMO, a CSI process may be configured with either of two CSI reporting classes, class A non-precoded or class B beamformed eMIMO type. FIG. 4A is a block diagram illustrating an example base station 400 transmitting non-precoded CSI-RS 401. In class A non-precoded reporting type, one non-zero power (NZP) CSI-RS resource per CSI process may be used for channel measurement in which the number of CSI-RS ports may be 8, 12, or 16. This category includes schemes where different CSI-RS ports may have the same wide beam width and direction and, hence, generally are useful in cell wide coverage. Interference measurement in class A reporting type may include one CSI-interference measurement (IM) resource per CSI process. The UE may report rank indicator, and CQI, as well as PMI, which consists of a first PMI corresponding to the parameters $(i_{11}, i_{12})$ and one or multiple second PMI corresponding to the parameter, $i_2$.

Base station 400 serves UEs 403 and 404 and UEs 405 and 406 in structure 40. 2D CSI-RS ports transmit non-precoded CSI-RS 401 and PDSCH 402 to UEs 403-406. In reporting CSI feedback, UEs 403-406 measure the non-precoded CSI-RS and reports CQI, first PMI $(i_{11}, i_{12})$ and one or more second PMI, $i_2$, (2D codebook), and rank indicator to base station 400.

Figure 4B:
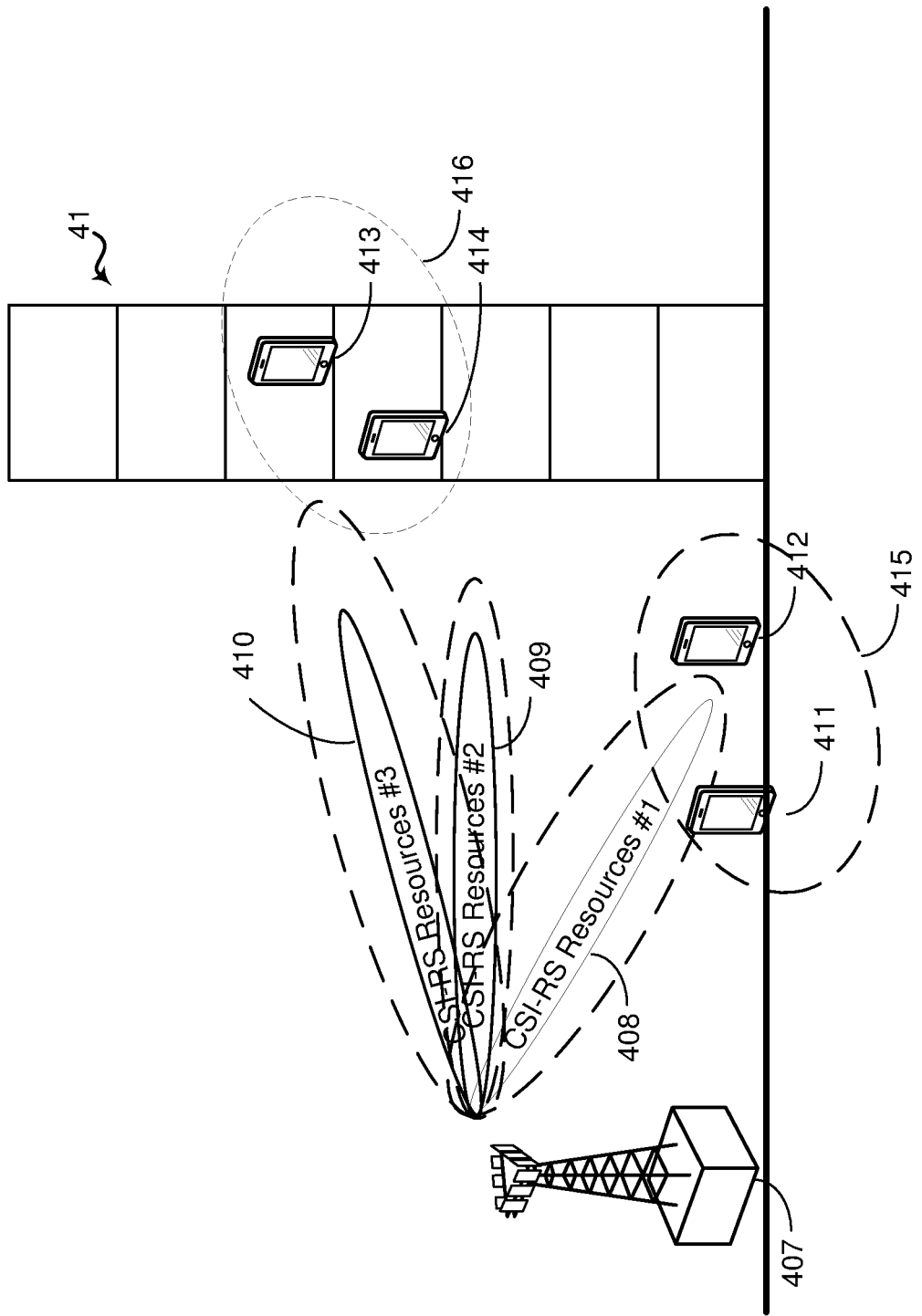
FIG. 4B is a block diagram illustrating an example base station transmitting beamformed CSI-RS using CSI-RS resources.

FIG. 4B is a block diagram illustrating an example base station 407 transmitting beamformed CSI-RS using CSI-RS resources 408-410. CSI-RS resources 408-410 may be directed to serve different UE groups, such as UE group 415, including UEs 411 and 412, and UE group 416, including UEs 413 and 414 in structure 41. Because different CSI-RS resources are used for different UE groups, when providing CSI feedback, UEs 411-414 report CQI, PMI (1D codebook), rank indicator, as well as the CSI-RS resource indicator (CRI), if K>1, which identifies to base station 407 which of the CSI-RS resources the UE has measured and provided channel state information (CSI) feedback for.

In class B beamformed CSI reporting type, each CSI process may be associated with K NZP CSI-RS resources/configurations, with $N_k$ ports for the $k^{th}$ CSI-RS resource (K could be ≥1), in which NA may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. Multiple CSI-IM per CSI process is also possible, with one-to-one linkage to each NZP CSI-RS resource.

Improving CSI-RS resource utilization is employed for beamformed CSI-RS based FD-MIMO. Legacy CSI-RS may be semi-statically configured and transmitted. For example, RRC configuration messages that configure the legacy CSI-RS may include information, such as the number of antenna ports, CSI-RS resource configuration (e.g., resource element (RE) locations), subframe periodicity/offset, power ratio, and the like. The resources occupied by CSI-RS may not currently be used for other purposes such as data transmission. A UE would apply a rate matching to PDSCH around the configured NZP (non-zero power) CSI-RS resources. For Class B FD-MIMO with UE-specific beamformed CSI-RS, a total CSI-RS overhead per cell will increase with the number of served UEs, which can be in the hundreds or more. Additionally, the existing CSI-RS can be transmitted on a pre-configured 5 ms time grid, which may not efficiently support fast CSI reporting, as would be used for bursty traffic. Depending on the CSI-RS triggering subframe, the CSI delay can range between 4 ms and 8 ms. Aperiodic CSI-RS has been proposed to improve CSI-RS resource utilization and reduce total CSI-RS overhead for UE-specific beamformed CSI-RS.

Aperiodic CSI-RS may improve CSI-RS resource utilization and increase configuration flexibility. Aperiodic CSI-RS transmissions, triggered through dynamic indication without pre-configured instances may provide more flexible resource usage. Resource allocation or configuration for aperiodic CSI-RS is semi-static, including number of ports. CSI-RS pattern (e.g., RE locations and power ratio) and the like. Presence or absence of aperiodic CSI-RS may be dynamically signaled by the uplink-related grant, such as the CSI request field in the uplink grant that assigns a one-shot aperiodic CSI-RS transmission in the same subframe as the uplink grant and also requests aperiodic CSI reporting based on the aperiodic CSI-RS resource. If multiple aperiodic CSI-RS resources are configured for a CSI process, either all resources or a subset of resource can be dynamically triggered by the associated uplink grant for aperiodic CSI reporting. For example, the eNB may freely choose and transmit CSI-RS from the preconfigured CSI-RS resource pooling shared by a group of UEs.

While aperiodic CSI-RS may improve resource utilization and reduce the overall CSI-RS overhead, it may increase UE processing complexity. Because a UE will first decode the uplink grant in order to discover the presence of aperiodic CSI-RS, the processing time budget for CSI calculation will be reduced. It should be noted that the impact on CSI processing time budget can be different for PDCCH and EPDCCH-based triggering. Alternatively, a UE will buffer potential CSI-RS tones and calculate CSI based on the hypothetical CSI-RS RE locations configured by the RRC configuration signals. If the UE fails to detect aperiodic CSI-RS in the subframe, the calculated CSI would be dropped. Since aperiodic CSI-RS may be presented in any downlink subframe, the UE may report and update CSI per subframe, resulting in a significant increase on CSI processing complexity. If aperiodic CSI-RS is supported for downlink carrier aggregation, the UE will process both PUSCH and up to 32 CSI processes in the same subframe. A large number of component carriers (CCs) with aperiodic CSI-RS would, thus, result in a substantial increase on UE processing complexity.

Figure 5:
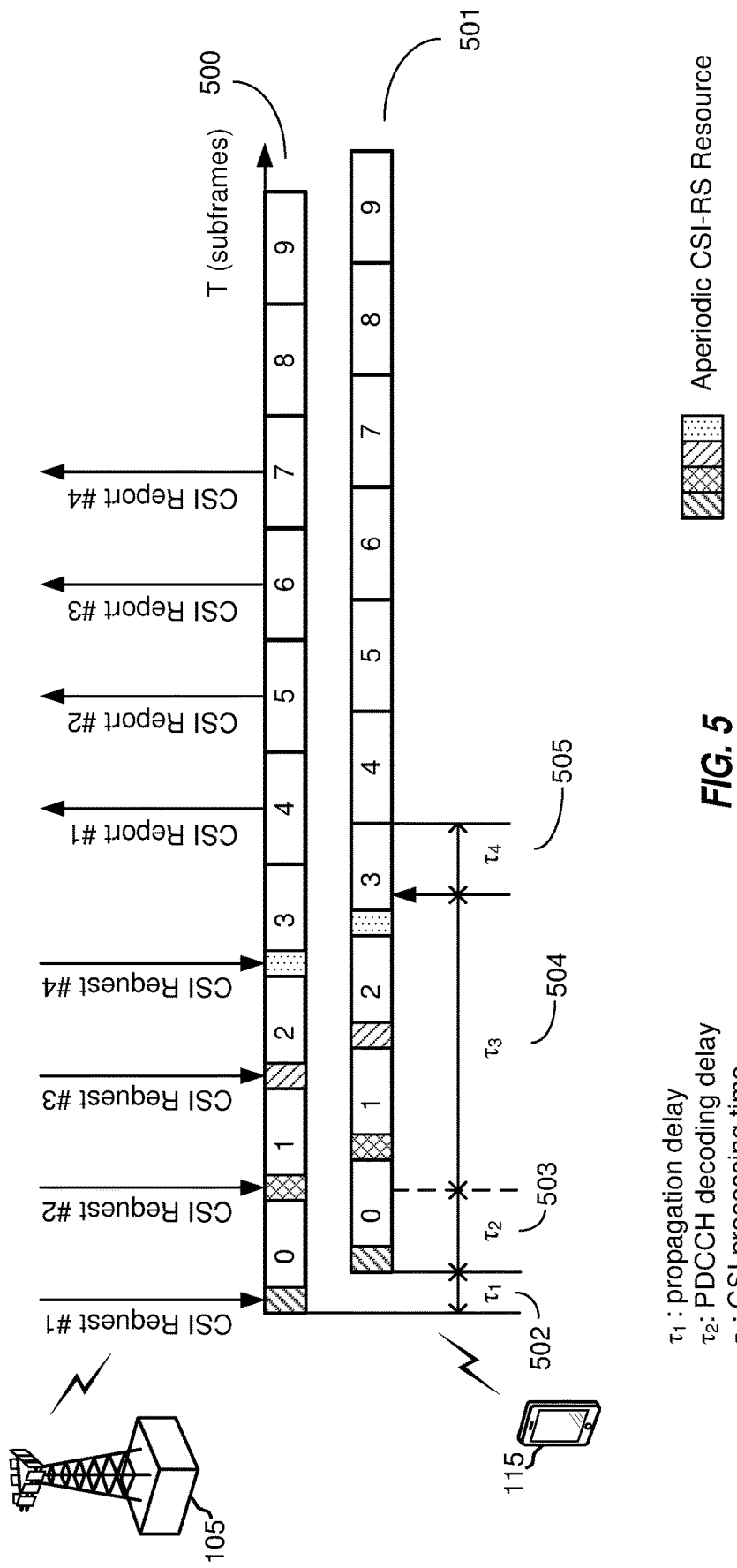
FIG. 5 is a block diagram illustrating a UE providing CSI measurement and reporting to a base station with PDCCH-based triggering of aperiodic CSI-RS.

FIG. 5 is a block diagram illustrating a UE 115 providing CSI measurement and reporting to a base station 105 with PDCCH-based triggering of aperiodic CSI-RS. Transmission stream 500 represents the communications to and from base station 105. Transmission stream 501 represents the communications to and from UE 115. The communications between UE 115 and base station 105 are offset based on a propagation delay 502, $\tau_1$. Base station 105 transmits a CSI request, CSI request #1-#4, using PDCCH to trigger aperiodic CSI-RS transmission in each of subframes 0-3. UE 115 transmits the corresponding CSI report, CSI reports #1-#4, during each of subframes 4-7, at a n+4 rate, where n represents a current subframe. After receiving the PDCCH, UE 115 is able to decode the PDCCH at a PDCCH decoding delay 503, $\tau_2$. An uplink timing advance 505, $\tau_4$, which corresponds to a value of $2\tau_1$, accounts for the propagation delay, leaving an available CSI processing time 504, $\tau_3$, for UE 115.

Figure 6:
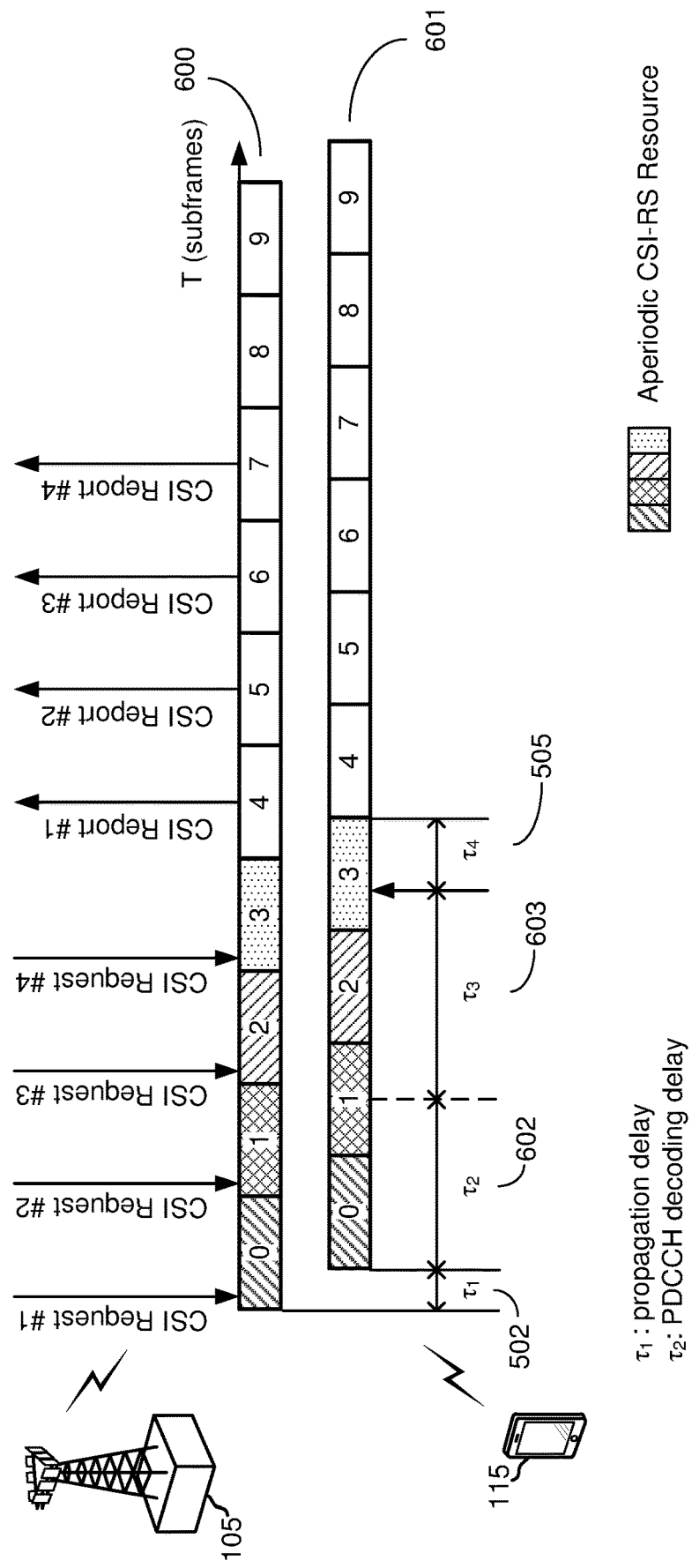
FIG. 6 is a block diagram illustrating a UE providing CSI measurement and reporting to a base station with EPDCCH-based triggering of aperiodic CSI-RS.

FIG. 6 is a block diagram illustrating a UE 115 providing CSI measurement and reporting to a base station 105 with EPDCCH-based triggering of aperiodic CSI-RS. The propagation delay 502, $\tau_1$, and uplink timing advance 505, $\tau_4$, are the same with PDCCH-based triggering of aperiodic CSI-RS (FIG. 5). However, as EPDCCH includes resources across the entire subframe, EPDCCH decoding delay 602, $\tau_2$, is increased. With the increase in EPDCCH decoding delay 602, CSI processing time 603, $\tau_3$, is further decreased. Thus. CSI processing time 603, $\tau_3$, is even less time than CSI processing time 504, $\tau_3$, with PDCCH-based triggering. Various aspects of the present disclosure are directed to relaxing or restricting UE processing to alleviate computation complexity when CSI-RS is dynamically present.

Figure 7:
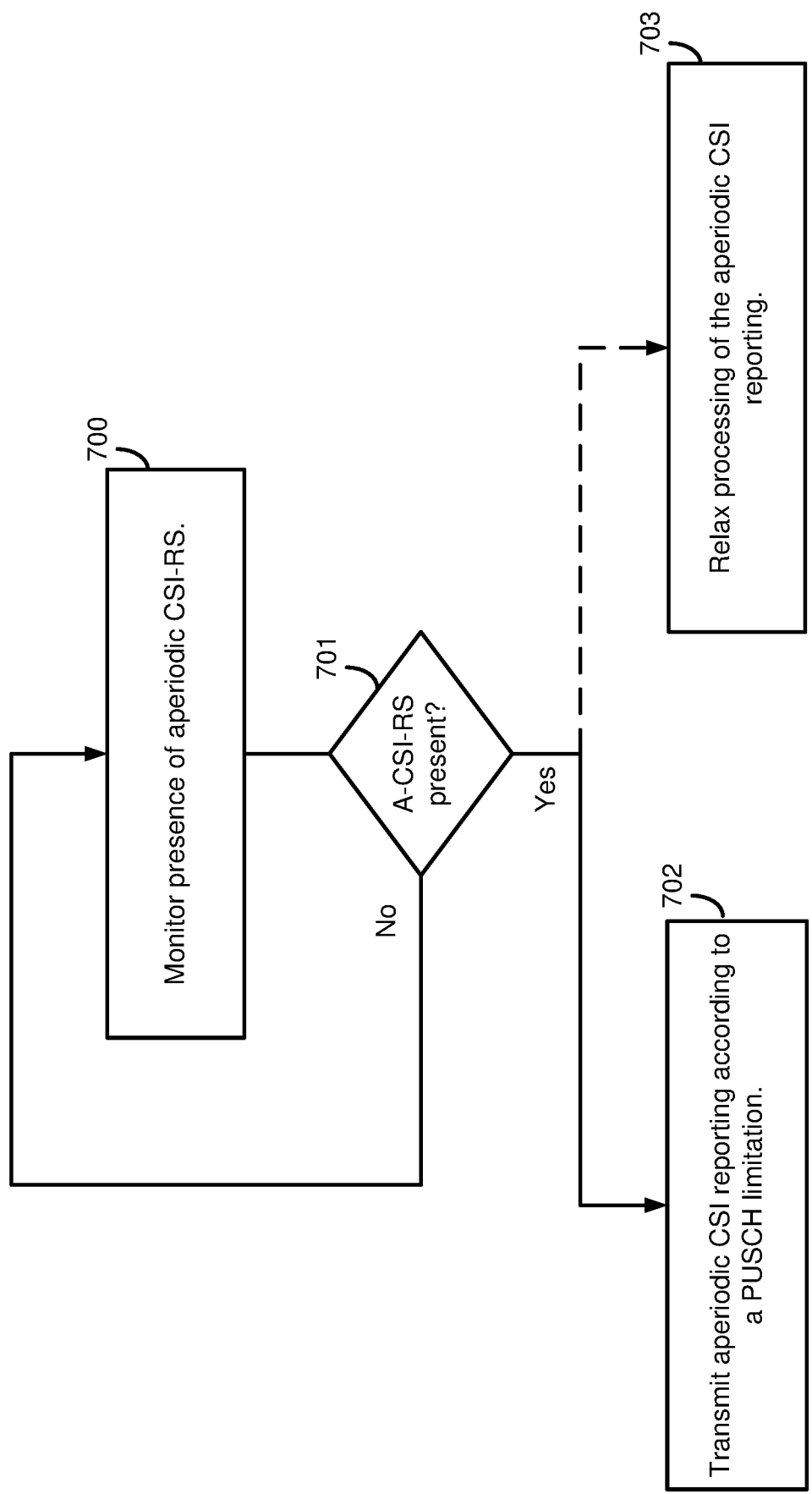
FIG. 7 is a block diagram illustrating example blocks executed to implement one aspect of the preset disclosure.
Figure 11:
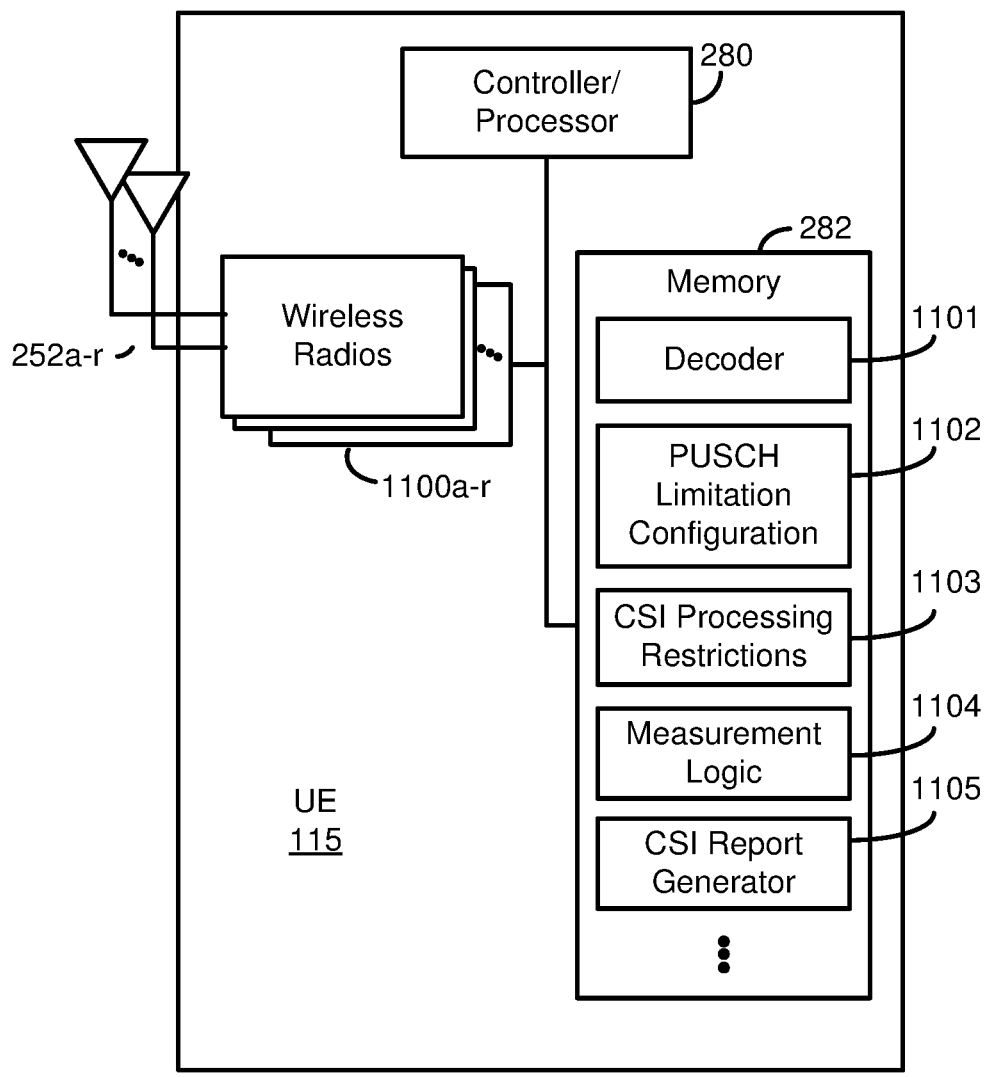
FIG. 11 is a block diagram illustrating a UE configured according to one aspect of the present disclosure.

FIG. 7 is a block diagram illustrating example blocks executed to implement one aspect of the preset disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266.

At block 700, a UE monitors for presence of aperiodic CSI-RS. For example, UE 115 monitors for the presence of aperiodic CSI-RS transmitted in PDCCH or EPDCCH via antennas 252a-r and wireless radios 1100a-r, under control of controller/processor 280. UE 115 decodes the PDCCH/EPDCCH using decoder 1101, under control of controller/processor 280, to determine whether such aperiodic CSI-RS is present.

At block 701, a determination is made at the UE whether aperiodic CSI-RS is detected. For example, after decoding the PDCCH or EPDCCH, UE 115 determines, under control of controller/processor 280, whether or not CSI-RS is present. If no aperiodic CSI-RS is detected, the UE will continue to monitor for aperiodic CSI-RS at block 700. If aperiodic CSI-RS is detected after decoding the UE transmits aperiodic CSI reporting, at block 702, according to a PUSCH limitation. For example, UE 115, accesses PUSCH limitation configuration information 1102, stored in memory 282, to determine a PUSCH limitation associated with aperiodic CSI reporting configurations. PUSCH limitation configuration information 1102 may include configuration information, such as configuring aperiodic CSI without any uplink shared channel (UL-SCH) data, configuring aperiodic CSI or uplink shared channel with single port transmission, configuring aperiodic CSI or up to rank 1 uplink shared channel, configuring aperiodic CSI or uplink shared channel with a maximum transport block size (TBS) or modulation and coding scheme (MCS), and the like. Once the PUSCH limitation is determined, UE 115 executes measurement logic 1104 to measure and determine the CSI based on the CSI-RS, and generates the CSI report, using CSI report generator 1105, both under control of controller/processor 280. The resulting CSI report may then be transmitted by UE 115 using wireless radios 1100a-r and antennas 252a-r.

If the UE detects aperiodic CSI-RS in operation of the monitoring of block 700, the UE, at block 703, may also optionally or additionally relax processing of the CSI reporting transmitted by the UE. For example, UE 115, when aperiodic CSI-RS is detected, accesses CSI processing restrictions 1103 to determine a level of CSI processing will be performed. In one example aspect. UE 115 sill not expect more than one CSI request to occur within a given, predetermined number of subframes to trigger CSI reporting on an aperiodic CSI-RS resource. UE 115 will drop any CSI reports for the CSI requests in excess of the predetermined number. In another example aspect, when UE 115 receives a number of CSI requests in excess of a predetermined threshold, UE 115 will not be required to update CSI for the requests over threshold number. When the CSI reporting is relaxed. UE 115 executes measurement logic 1104 to measure and determine the CSI for the CSI requests within the threshold number of requests, and generates the CSI report, using CSI report generator 1105, both under control of controller/processor 280. The resulting CSI report may then be transmitted by UE 115 using wireless radios 1100a-r and antennas 252a-r.

It should be noted that aspects of the present disclosure may provide for either the PUSCH limitation-based CSI reporting or relaxed CSI reporting requirement blocks to be executed as alternative options when aperiodic CSI-RS are detected, or, in additional aspects, a combination of both options may be executed.

In aspects of the present disclosure implementing the PUSCH limitation-based option of block 702, the triggering of aperiodic CSI-RS resource is subject to PUSCH limitations. For example, in a first alternative aspect. UE 115 may be configured for aperiodic CSI without UL-SCH, such that PUSCH is not supported together with aperiodic CSI-RS. In a second alternative aspect. UE 115 may be configured for either aperiodic CSI or UL-SCH triggered by a downlink grant identifying single port transmission (e.g., DCI format 0). In such second alternative, no DCI format 4 (e.g., multiple antenna port transmission) would be allowed to trigger aperiodic CSI-RS presence.

In a third alternative aspect of the block 702 PUSCH limitation-based option, UE 115 may be configured for either aperiodic CSI or UL-SCH at up to rank 1. Thus, no uplink MIMO would be available to trigger aperiodic CSI-RS presence. In a fourth alternative aspect of the PUSCH limitation-based option of block 702, UE 115 may be configured for either aperiodic CSI or UL-SCH with a maximum TBS/MCS (e.g., a threshold TBS or MCS would be identified above which would not be allowed to trigger A-CSI-RS presence.

The various alternatives of the PUSCH limitation-based option of block 702 may be further modified based on a maximum uplink timing advance ($\tau_4$), a PDCCH only triggering, or different restrictions configured for PDCCH and EPDCCH-based triggering.

It should further be noted that when a UE, such as UE 115, is configured for uplink carrier aggregation, the PUSCH limitation-based option of block 702 may provide for its restrictions to be performed by limiting the number of PUSCH transmissions UE 115 makes over different component carriers (CCs), or the combinations of PUSCH transmission over different CCs. Additionally, the restriction may be performed on a per PUCCH group basis, in case of dual connectivity or dual-PUCCH carrier aggregation or restricted based on the number of CCs for PUSCH. Each such PUCCH group may be configured to have different restrictions for the PUSCH limitation-based option of block 702.

Figure 8:
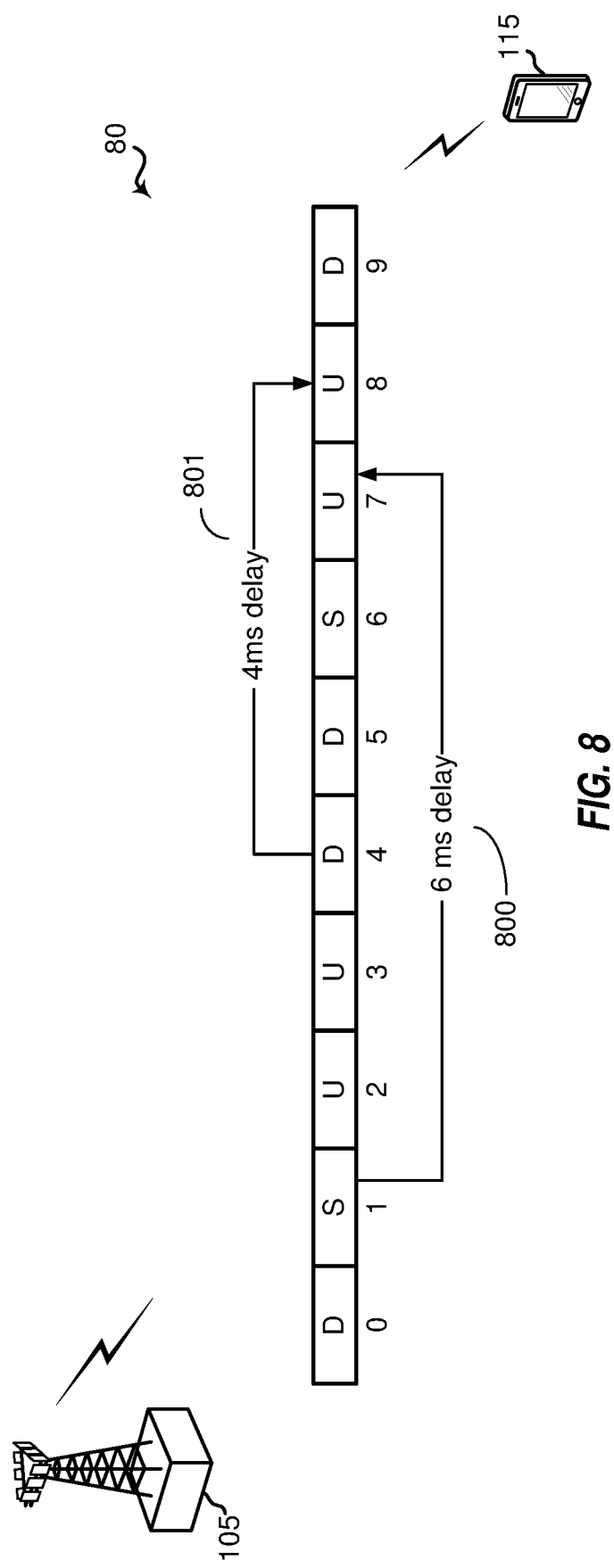
FIG. 8 is a block diagram illustrating a UE configured according to one aspect of the present disclosure communicating with a base station using time division duplex (TDD) transmissions.

FIG. 8 is a block diagram illustrating a UE 115 configured according to one aspect of the present disclosure communicating with a base station 105 using time division duplex (TDD) transmissions. With UE 115 and base station 105 operating the PUSCH limitation-based option of block 702 using TDD communications, the PUSCH scheduling timing for UE 115 in some TDD configurations and some subframes in certain TDD configurations may be greater than or equal to 4 ms. With PUSCH scheduling delays greater than 4 ms, UE 115 will have more time for CSI processing. Therefore, the applicability of restrictions from the PUSCH limitation-based option of block 702 may depend on the actual PUSCH scheduling timing. For example, the restrictions may not be applied to PUSCH scheduling delay 800, as it includes a delay of more than 4 ms. In contrast, the restrictions may be applied to PUSCH scheduling delay 801, as it is equal to 4 ms.

In aspects of the present disclosure implementing the relaxed CSI reporting option of block 703, relaxations to the CSI feedback may be associated with presence of aperiodic CSI-RS detected by a UE, such as UE 115. In a first alternative implementation of the relaxed CSI reporting option, two separate UE capabilities may be available indicating a maximum number of CSI processes to be updated for one CSI triggering DCI, based on whether or not the CSI-RS is dynamically triggered to be present or not. For example, if CSI-RS associated with all CSI processes are semi-statically configured, a UE may feedback reports for up to $N_x$ (e.g., 32) fresh CSI processes, while, if CSI-RS is dynamically configured, the UE may feedback reports for up to $N_y$ fresh CSI processes, where $N_y < N_x$ (e.g., 5).

It should be noted that the capabilities can be further separately defined for periodic CSI and aperiodic CSI since aperiodic CSI-RS is used for aperiodic CSI reporting. In general, this first alternative implementation of the relaxed CSI reporting option of block 703 operates to limit the number of CSI reports for one CSI triggering DCI when an aperiodic CSI-RS resource is configured.

In a second alternative implementation of the relaxed CSI reporting option of block 703, the processing complexity for aperiodic CSI feedback may be limited by restricting the number of back-to-back CSI triggers when one CSI process is configured. In a first option for restricting the number of back-to-back CSI triggers, the UE will be configured not to expect more than one CSI request to occur within a predetermined number, M, of subframes (e.g., M=4, 5, 6) to trigger a CSI report on aperiodic CSI-RS resources. The UE would drop any of the CSI reports corresponding to CSI requests in excess of M. In a second option for restricting back-to-back CSI triggers, the UE is configured with a predetermined threshold, X, for unreported CSI requests. In case the number of unreported CSI request exceeds this threshold, X, the UE would not be expected to update the CSI for those unreported requests exceeding X. In various aspects, the threshold, X, may equal $N_{CSI-P}$, where $N_{CSI-P}=\{1, 3, 4\}$ represents a UE that is capable of signaling a maximum number of CSI processes supported for the serving cell.

Figure 9:
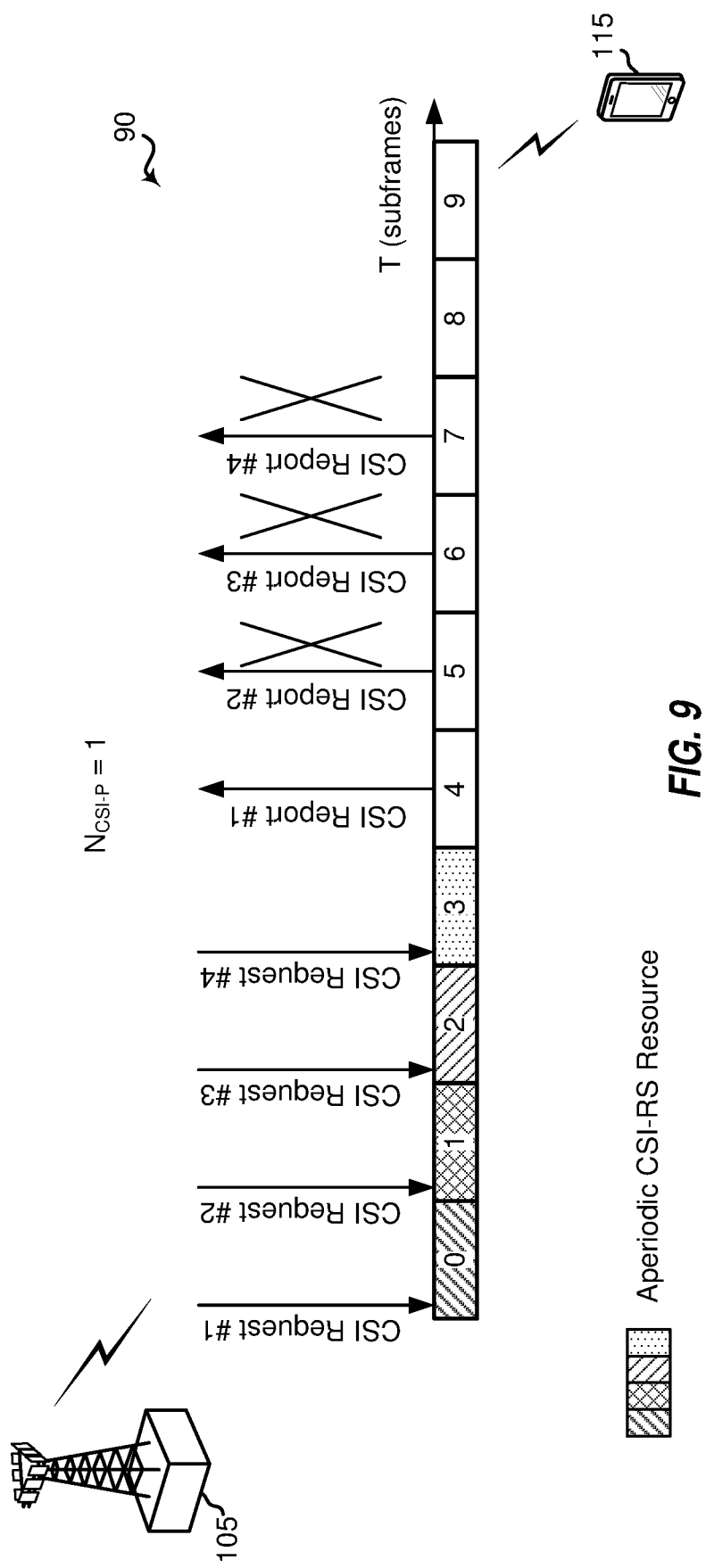
FIG. 9 is a block diagram illustrating a UE configured according to one aspect of the present disclosure in communication with a base station.

FIG. 9 is a block diagram illustrating a UE 115 configured according to one aspect of the present disclosure in communication with a base station 105. In the illustrated example, UE 115 is configured to operate using the second option of the second alternative implementation of the relaxed CSI reporting option of block 703. UE 115 is further configured to support a maximum of one CSI process for a serving cell, such as base station 105. Therefore, $N_{CSI-P}=1$ for UE 115. On reception of an aperiodic CSI report request, UE 115 will not be expected to update the CSI corresponding to the aperiodic CSI-RS if there is a pending CSI report associated with previous CSI requests. As illustrated, base station 105 transmits aperiodic CSI requests, CSI requests #1-#4 to trigger aperiodic CSI-RS, in subframes 0-3, respectively, of communication stream 90. Based on CSI report timeline. UE 115 would be scheduled to report the aperiodic CSI, CSI report #1-#4, in subframes 4-7, respectively. The operation of this example second option may be further illustrated in Table 1 below.

TABLE 1

| SF | 0 | 1 | 2 | 3 | 4 | 5 | 6 | 7 |
|---|---|---|---|---|---|---|---|---|
| A-CSI-RS | #1 | #2 | #3 | #4 | none | none | none | none |
| Unreported | 1 | 2 | 3 | 4 | 3 | 2 | 1 | 0 |
| Accurate | | | | | #1 | | | |
| Inaccurate | | | | | | #2 | #3 | #4 |

As indicated in Table 1, at subframes 1-3, UE 115 continues to accumulate aperiodic CSI requests based on the aperiodic CSI-RS transmitted by base station 105. Because UE 115 is configured to support a maximum of one CSI process, each unreported CSI requests #2-#4 will not be expected by either base station 105 or UE 115 to be reported accurately by UE 115. Thus, after reporting CSI report #1 at subframe 4 accurately, base station 105 may ignore CSI reports #2-#4 in subframes 5-7 as being inaccurate.

Figure 10:
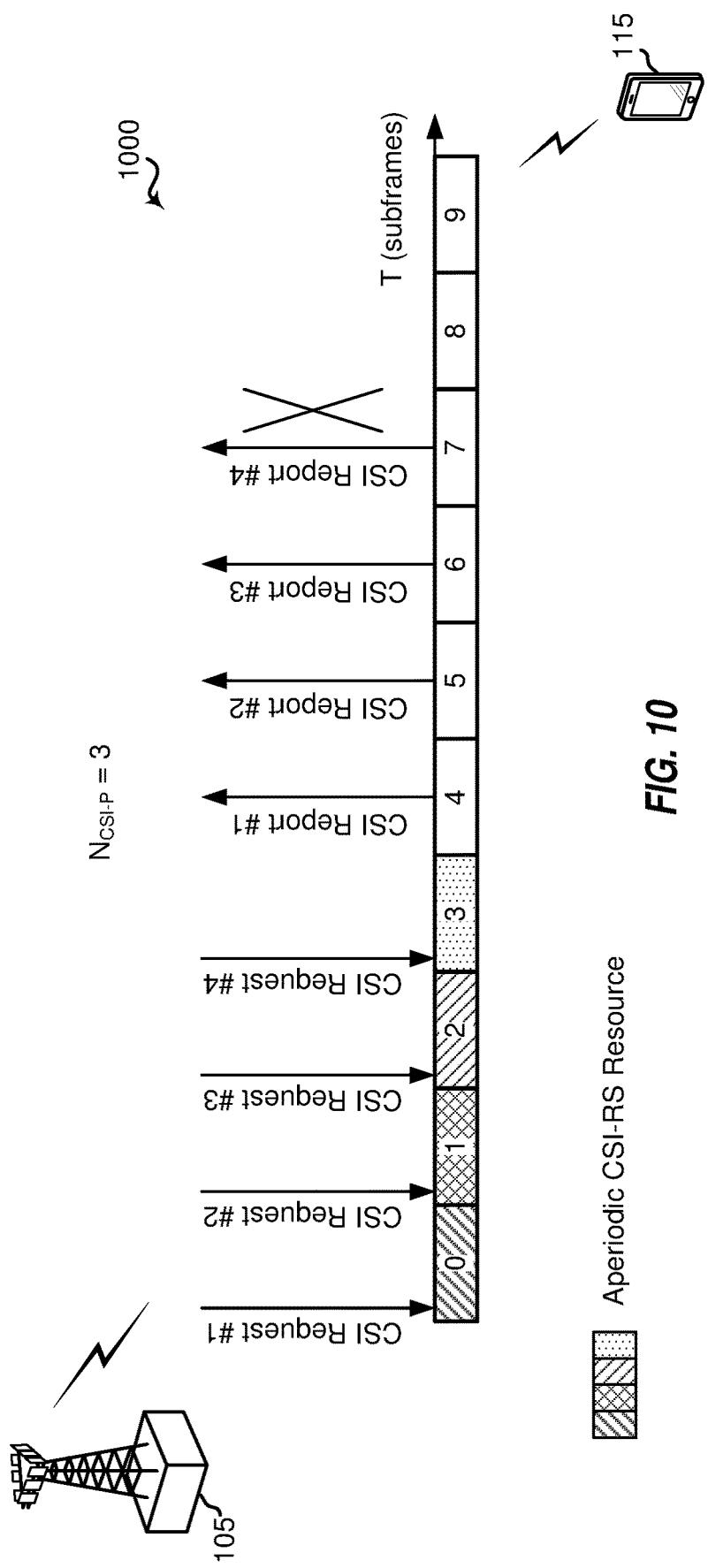
FIG. 10 is a block diagram illustrating a UE configured according to one aspect of the present disclosure in communication with a base station.

FIG. 10 is a block diagram illustrating a UE 115 configured according to one aspect of the present disclosure in communication with a base station 105. In the illustrated example, UE 115 is configured to operate using the second option of the second alternative implementation of the relaxed CSI reporting option of block 703. UE 115 is configured to support multiple CSI processes (e.g., $N_{CSI-P}=3$) but further configured with a single CSI process for a serving cell, such as base station 105. As illustrated, base station 105 transmits aperiodic CSI requests, CSI requests #1-#4 to trigger aperiodic CSI-RS, in subframes 0-3, respectively, of communication stream 90. Based on CSI report timeline. UE 115 would be scheduled to report the aperiodic CSI, CSI report #1-#4, in subframes 4-7, respectively. The operation of this example second option may be further illustrated in Table 2 below.

TABLE 2

| SF | 0 | 1 | 2 | 3 | 4 | 5 | 6 | 7 |
|---|---|---|---|---|---|---|---|---|
| A-CSI-RS | #1 | #2 | #3 | #4 | none | none | none | none |
| Unreported | 1 | 2 | 3 | 4 | 3 | 2 | 1 | 0 |
| Accurate |  |  |  |  | #1 | #2 | #3 |  |
| Inaccurate |  |  |  |  |  |  |  | #4 |

As indicated in Table 2, at subframes 0-3, UE 115 accumulates aperiodic CSI requests based on the aperiodic CSI-RS transmitted by base station 105. Because UE 115 is configured to support a maximum of three CSI processes, unreported CSI requests #4 will not be expected by either base station 105 or UE 115 to be reported accurately by UE 115. Thus, after accurately reporting CSI reports #1-#3, at subframes 4-6, respectively, base station 105 may ignore CSI report #4 in subframes 7 as being inaccurate. Therefore, under the illustrated example configuration, when UE 115 receives a number of unreported CSI requests in excess of its threshold $N_{CSI-P}$. UE 115 would not be expected to update CSI for the additional CSI requests in excess of the threshold that trigger a CSI report associated with aperiodic CSI-RS.

It should be noted that a CSI process associated with a CSI request may be counted as unreported in a subframe before the subframe where the PUSCH carrying the corresponding CSI is transmitted. It should further be noted that, for the case of UE 115 being configured for two or more configured CSI processes, the existing rule for CSI feedback processing relaxation can be reused which is based on the example second option illustrated in FIG. 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The present disclosure comprises a first aspect, such as a non-transitory computer-readable medium having program code recorded thereon which, when executed by a computer, causes the computer to implement functionality, the program code comprising:

program code for causing a computer to monitor, by a UE, for presence of aperiodic CSI-RS;

program code, executable in response to detection of the aperiodic CSI-RS, to one or both of:

transmit aperiodic CSI reporting according to an uplink shared channel limitation; and relax processing of the aperiodic CSI reporting transmitted by the UE.

Based on the first aspect, the non-transitory computer-readable medium of a second aspect, wherein the uplink shared channel limitation includes one of:

program code for causing the computer to transmit an aperiodic CSI without support for uplink data on an uplink shared channel;

program code for causing the computer to transmit the aperiodic CSI or a single port transmission uplink shared channel;

program code for causing the computer to transmit the aperiodic CSI or a rank 1 uplink shared channel; or program code for causing the computer to transmit the aperiodic CSI or an uplink shared channel with a predetermined threshold limitation of one of: a transport block size (TBS), or a modulation and coding scheme (MCS).

Based on the second aspect, the non-transitory computer-readable medium of a third aspect, wherein the uplink shared channel limitation is determined based on one of:

a predetermined threshold uplink timing advance;

an aperiodic CSI-RS trigger via a physical downlink control channel (PDCCH); or the aperiodic CSI-RS trigger via an enhanced PDCCH (EPDCCH).

Based on the second aspect, the non-transitory computer-readable medium of a fourth aspect, when the UE is configured for uplink carrier aggregation, the uplink shared channel limitation further includes one of:

program code for causing the computer to limit a number of uplink shared channel transmissions over one or more of the component carriers (CCs) of a plurality of CCs configured for the uplink carrier aggregation;

program code for causing the computer to restrict a combination of the uplink shared channel transmissions over the one or more of the CCs;

program code for causing the computer to restrict the uplink shared channel transmissions based on a per physical uplink control channel (PUCCH) group; or program code for causing the computer to restrict the uplink shared channel transmissions based on a number of CCs designated for an uplink shared channel.

Based on the fourth aspect, the non-transitory computer-readable medium of a fifth aspect, wherein the program code for causing the computer to restrict the uplink shared channel transmissions based on the per PUCCH group includes program code for causing the computer to restrict with a different restriction for each PUCCH group.

Based on the second aspect, the non-transitory computer-readable medium of a sixth aspect, wherein the uplink shared channel limitation is determined based on an uplink scheduling channel scheduling delay less than or equal to a predetermined minimum scheduling delay.

Based on the first aspect, the non-transitory computer-readable medium of a seventh aspect, further including:

program code for causing the computer to determine, by the UE, whether CSI-RS associated with all of a plurality of CSI processes for CSI reporting are configured one of: semi-statically, or dynamically;

program code for causing the computer to set a number of CSI processes for CSI reporting by the UE to a first amount up to a total number of the plurality of CSI processes in response to a determination of semi-statically configured; and program code for causing the computer to restrict the number of CSI processes for CSI reporting by the UE to a second amount up to a subset of the plurality of CSI processes in response to a determination of dynamically configured, wherein the subset is less than the total number.

Based on the first aspect, the non-transitory computer-readable medium of an eighth aspect, wherein, when the UE is configured with one CSI process, the program code for causing the computer to relax the processing of the aperiodic CSI reporting includes one of:

program code for causing the computer to drop all excess aperiodic CSI reports, wherein the excess aperiodic CSI reports are defined to include any aperiodic CSI reports corresponding to any CSI request received by the UE in excess of one CSI request within a predetermined number of subframes; or program code for causing the computer to report CSI based on outdated CSI measurements for the one or more CSI request in response to the total number of CSI requests for the unreported CSI exceeding a triggering threshold.

Based on the eighth aspect, the non-transitory computer-readable medium of a ninth aspect, wherein the triggering threshold is determined by a total number of CSI processes supported by UE capability.

A tenth aspect of the non-transitory computer-readable medium of any combination of the first through ninth aspects.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices. e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory. ROM memory. EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM. EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A. B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
monitoring, by a user equipment (UE), for aperiodic channel state information (CSI) reference signals (CSI-RS); and
executing an algorithm that provides for performing, by the UE, at least one report processing for providing at least one CSI report in response to detecting presence of a number of instances of the aperiodic CSI-RS from a base station (BS) that is directed to the UE during the monitoring for the aperiodic CSI-RS;

wherein:
each of the report processing is a generation of a respective one of the at least one CSI report, a performance of a respective measurement for generation of the at least one CSI report, or a transmission to the BS of the at least one CSI report; and a total number of instances of the at least one report processing that is performed in response to the detecting of the presence of the number of instances of the aperiodic CSI-RS is less than the number of instances of the aperiodic CSI-RS due to a rate that is predefined for the performing of the report processing, the method further comprising: determining an uplink shared channel limitation associated with reporting of the at least one CSI report on an uplink shared channel, wherein the uplink shared channel limitation is determined based on a predetermined threshold uplink timing advance.

2. The method of claim 1, wherein the UE is configured for uplink carrier aggregation, and the uplink shared channel limitation further includes configuration of the UE for restricting a combination of a uplink shared channel transmissions over the one or more of the CCs.

3. The method of claim 1, wherein:
the UE is configured for uplink carrier aggregation;
the uplink shared channel limitation includes configuration of the UE for restricting a uplink shared channel transmissions based on a per physical uplink control channel (PUCCH) group; and
the restricting the uplink shared channel transmissions based on the per physical uplink control channel (PUCCH) group includes restricting with a different restriction for each PUCCH group.

4. The method of claim 1, wherein the uplink shared channel limitation is determined based on an uplink scheduling channel scheduling delay less than or equal to a predetermined minimum scheduling delay.

5. The method of claim 1, further including:
determining, by the UE, for each of the CSI-RS whether the respective CSI-RS is configured semi-statically or dynamically, wherein:
the performing of the at least one report processing is limited by the rate that is predefined for only those of the CSI-RS that are determined to be configured dynamically; and
the performing of the at least one report processing is at a second rate that is higher than the rate that is predefined for those of the CSI-RS that are determined to be configured semi-statically.

6. The method of claim 1, further comprising responding, by the UE, to one or more of CSI requests associated with respective ones of the aperiodic CSI-RS based on outdated CSI measurements in response to total number of the CSI requests for unreported CSI exceeding a triggering threshold.

7. The method of claim 6, wherein the triggering threshold is determined by a total number of CSI processes supported by UE capability.

8. The method of claim 1, wherein the algorithm further provides that the at least one CSI report is transmitted at a slower than a rate at which CSI reports are transmitted for periodic CSI-RS.

9. The method of claim 1, wherein the uplink shared channel limitation includes configuration of the UE for one of:
processing an aperiodic CSI without support for uplink data on the uplink shared channel;
processing the aperiodic CSI on a single port transmission uplink shared channel; and
processing the aperiodic CSI on a rank 1 uplink shared channel.

10. The method of claim 1, wherein the executing of the algorithm results in the UE responding to the detected presence of the number of instances of the aperiodic CSI-RS by dropping all aperiodic CSI reports that correspond to any CSI request received by the UE in excess of one CSI request within a predetermined number of subframes.

11. The method of claim 1, wherein the monitoring for the aperiodic channel state information (CSI) reference signals (CSI-RS) is performed in a full dimension multiple input, multiple output (FD-MIMO) environment with UE-specific beamformed CSI-RS.

12. An apparatus configured for wireless communication, comprising:
means for monitoring, by a user equipment (UE), for aperiodic channel state information (CSI) reference signals (CSI-RS); and
means for executing an algorithm that provides for the UE to perform at least one report processing for providing at least one CSI report in response to detecting presence of a number of instances of the aperiodic CSI-RS from a base station (BS) that is directed to the UE during the monitoring for the aperiodic CSI-RS;

wherein:
each of the report processing is a generation of a respective one of the at least one CSI report, a performance of a respective measurement for generation of the at least one CSI report, or a transmission to the BS of the at least one CSI report; and a total number of instances of the at least one report processing that is performed in response to the detecting of the presence of the number of instances of the aperiodic CSI-RS is less than the number of instances of the aperiodic CSI-RS due to a rate that is predefined for the performing of the report processing, the apparatus further comprising: means for determining an uplink shared channel limitation associated with reporting of the at least one CSI report on an uplink shared channel, wherein the uplink shared channel limitation is determined based on a predetermined threshold uplink timing advance.

13. The apparatus of claim 12, further comprising means for determining an uplink shared channel limitation associated with reporting of the at least one CSI report on an uplink shared channel.

14. The apparatus of claim 13, wherein the UE is configured for uplink carrier aggregation, and the uplink shared channel limitation further includes configuration of the UE with means for restricting a uplink shared channel transmissions based on a per physical uplink control channel (PUCCH) group.

15. The apparatus of claim 13, wherein the uplink shared channel limitation is determined based on an uplink scheduling channel scheduling delay less than or equal to a predetermined minimum scheduling delay.

16. The apparatus of claim 12, further comprising means for determining an uplink shared channel limitation associated with reporting of the at least one CSI report on an uplink shared channel, wherein:
the UE is configured for uplink carrier aggregation; and
the uplink shared channel limitation further includes configuration of the UE with means for restricting a uplink shared channel transmissions based on a per physical uplink control channel (PUCCH) group by which each PUCCH group is restricted with a different restriction.

17. The apparatus of claim 12, further including:
means for determining, by the UE, for each of the CSI-RS whether the respective CSI-RS is configured semi-statically or dynamically, wherein:
the performing of the at least one report processing is limited by the rate that is predefined for only those of the CSI-RS that are determined to be configured dynamically; and
the performing of the at least one report processing is at a second rate that is higher than the rate that is predefined for those of the CSI-RS that are determined to be configured semi-statically.

18. The apparatus of claim 12, wherein the executing of the algorithm results in one of:
the UE responding to the detected presence of the number of instances of the aperiodic CSI-RS by dropping all aperiodic CSI reports that correspond to any CSI request received by the UE in excess of one CSI request within a predetermined number of subframes; and
the UE responding to one or more of CSI requests associated with respective ones of the aperiodic CSI-RS based on outdated CSI measurements in response to total number of the CSI requests for unreported CSI exceeding a triggering threshold.

19. The apparatus of claim 12, wherein the executing of the algorithm results in the UE responding to one or more CSI requests associated with respective ones of the aperiodic CSI-RS based on outdated CSI measurements in response to total number of the CSI requests for unreported CSI exceeding a triggering threshold that is determined by a total number of CSI processes supported by UE capability.

20. An apparatus configured for wireless communication, the apparatus comprising:
at least one processor of a user equipment (UE); and
a memory coupled to the at least one processor,
wherein:
the at least one processor is configured to:
monitor for aperiodic channel state information (CSI) reference signals (CSI-RS); and
execute an algorithm that provides for performing, by the UE, at least one report processing for providing at least one CSI report in response to detecting presence of a number of instances of the aperiodic CSI-RS from a base station (BS) that is directed to the UE during the monitoring for the aperiodic CSI-RS;
each of the report processing is a generation of a respective one of the at least one CSI report, a performance of a respective measurement for generation of the at least one CSI report, or a transmission to the BS of the at least one CSI report; and
a total number of instances of the at least one report processing that is performed in response to the detecting of the presence of the number of instances of the aperiodic CSI-RS is less than the number of instances of the aperiodic CSI-RS due to a rate that is predefined for the performing of the report processing,
the at least one processor further configured to: determine an uplink shared channel limitation associated with reporting of the at least one CSI report on an uplink shared channel, wherein the uplink shared channel limitation is determined based on a predetermined threshold uplink timing advance.

21. The apparatus of claim 20, wherein the at least one processor is further configured to determine an uplink shared channel limitation associated with reporting of the at least one CSI report on an uplink shared channel, wherein the uplink shared channel limitation includes configuration of the UE for one of:
processing an aperiodic CSI without support for uplink data on an uplink shared channel;
processing the aperiodic CSI or an uplink shared channel with single port transmission; and
processing the aperiodic CSI or up to rank 1 uplink shared channel.

22. The apparatus of claim 21, wherein the at least one processor is configured for uplink carrier aggregation, and the uplink shared channel limitation further includes configuration of the at least one processor to restrict a uplink shared channel transmissions based on a number of CCs designated for an uplink shared channel.

23. The apparatus of claim 21, wherein the uplink shared channel limitation is determined based on an uplink scheduling channel scheduling delay less than or equal to a predetermined minimum scheduling delay.

24. The apparatus of claim 20, wherein:
the at least one processor is further configured to determine an uplink shared channel limitation associated with reporting of the at least one CSI report on an uplink shared channel;
the UE is configured for uplink carrier aggregation;
the uplink shared channel limitation includes configuration of the UE for restricting the uplink shared channel transmissions based on a per physical uplink control channel (PUCCH) group; and
the restricting of a uplink shared channel transmissions based on the per PUCCH group includes restricting with a different restriction for each PUCCH group.

25. The apparatus of claim 20, wherein:
the at least one processor is configured for the UE to determine for each of the CSI-RS whether the respective CSI-RS is configured semi-statically or dynamically;
the performing of the at least one report processing is limited by the rate that is predefined for only those of the CSI-RS that are determined to be configured dynamically; and
the performing of the at least one report processing is at a second rate that is higher than the rate that is predefined for those of the CSI-RS that are determined to be configured semi-statically.

26. The apparatus of claim 20, wherein the executing of the algorithm results in one of:
the UE responding to the detected presence of the number of instances of the aperiodic CSI-RS by dropping all aperiodic CSI reports that correspond to any CSI request received by the UE in excess of one CSI request within a predetermined number of subframes; and
the UE responding to one or more of CSI requests associated with respective ones of the aperiodic CSI-RS based on outdated CSI measurements in response to total number of the CSI requests for unreported CSI exceeding a triggering threshold.

27. The apparatus of claim 20, wherein the executing of the algorithm results in the UE responding to one or more CSI requests associated with respective ones of the aperiodic CSI-RS based on outdated CSI measurements in response to total number of the CSI requests for unreported CSI exceeding a triggering threshold that is determined by a total number of CSI processes supported by UE capability.

* * * * *